(12) United States Patent
Bang

(10) Patent No.: US 8,611,027 B2
(45) Date of Patent: Dec. 17, 2013

(54) WIDE DISPLAY WITH LENS

(76) Inventor: Chaewon Bang, Cresskill, NJ (US)

( * ) Notice: Subject to any disclaimer, the term of this patent is extended or adjusted under 35 U.S.C. 154(b) by 70 days.

(21) Appl. No.: 13/373,221

(22) Filed: Nov. 8, 2011

(65) Prior Publication Data

US 2013/0021682 A1    Jan. 24, 2013

(30) Foreign Application Priority Data

Jul. 20, 2011    (KR) .................. 10-2011-0072084

(51) Int. Cl.
*G02B 7/02*    (2006.01)

(52) U.S. Cl.
USPC ............................ 359/811; 359/818; 359/819

(58) Field of Classification Search
USPC .................................. 359/694–704, 811–830
See application file for complete search history.

(56) References Cited

U.S. PATENT DOCUMENTS 8,199,125 B2 *  6/2012  Misawa et al. ................. 345/173
8,251,341 B2 *  8/2012  Wang et al. .................... 248/688

* cited by examiner

*Primary Examiner* — Mohammed Hasan
(74) *Attorney, Agent, or Firm* — Daniel P. Burke & Associates, PLLC

(57) ABSTRACT

Disclosed herein is a wide display with a lens. The lens is provided on the front of a display unit so that a display unit protection member which is provided on the perimeter of the display unit can be optically hidden by an optical illusion effect induced by the lens and without changing the structure of the display unit. Further, an image displayed on the display unit can look smoother, and the image can be displayed in such a way that it looks wider. Moreover, the present invention can improve the satisfaction of customers who want to increase the size of an image displayed on the display unit. Furthermore, the present invention can reduce the burden of an enormous investment in equipment that is required to produce display units due to the recent trend of increasing size.

14 Claims, 8 Drawing Sheets

WIDE DISPLAY WITH LENS

BACKGROUND OF THE INVENTION

1. Field of the Invention

The present invention relates generally to a technology pertaining to electronic equipment and, more particularly, to a wide display in which a lens is disposed on the front of a display unit so that a display unit protection member provided on the perimeter of the display unit is optically hidden by an optical illusion effect, thus making an image displayed on the display unit look wider.

2. Description of the Related Art

To date, a variety of methods for increasing the screen size of a single display unit, such as a TV, a computer monitor, a liquid crystal display, etc., have been under discussion.

However, in the conventional production methods, because production equipment is designed to correspond to a desired screen size, the screen size of display units to be produced is limited by the capacity of the production equipment. To increase the screen size of the display units, all the production equipment must be re-designed to the increased screen size. This requires a lot of investment in equipment costs.

Further, in the conventional technique, a designer cannot freely set or increase the screen size of a display unit. Even if wide-screen display units are able to be produced, as the screen size of the display unit increases, the price of the product should also increase, and such expensive wide-screen display units place a burden on consumers who want to purchase the display units.

Moreover, in the conventional technique, when several small display panels are connected to each other on a level to form a single screen, because the peripheral frame of each display panel causes a blank space and the blank space cannot be technically eliminated, the entire screen is divided into the same number of portions as there are display panels. In addition, parting lines are formed on the entire screen and these deteriorate the quality of the entire screen of the integrated display panels.

SUMMARY OF THE INVENTION

Accordingly, the present invention has been made keeping in mind the above problems occurring in the prior art, and an object of the present invention is to provide a wide display with a lens in which the lens is provided on the front of a display unit, and a distance between the lens and the front surface of the display unit is adjusted to an appropriate degree, so that without changing the structure of the display unit, a display unit protection member which is provided on the perimeter of the display unit can be optically hidden only by an optical illusion effect induced by the lens, and an image displayed on the display unit can look wider.

Another object of the present invention is to provide a wide display with a lens in which the image displayed on the display unit can look smoother, and the image can be displayed in such a way that it looks wider.

A further object of the present invention is to provide a wide display with a lens which can increase satisfaction for those customers who want to increase the size of an image displayed on the display unit, thus increasing the buying rate and sales of the product, and which can reduce a burden on enormous equipment investment that is required to produce display units due to the recent trend of increasing size because of the consumer trend to want to watch more realistic images, so that when use of the technique of the present invention is promoted in this art, the industrial development and national development can be promoted.

In order to accomplish the above object, in an aspect, the present invention provides a wide display, including a display unit protection member, a support frame and a lens. The display unit protection member is provided on a perimeter of a display unit. A plurality of insert holes are formed in the display unit protection member. The support frame has a plurality of protrusions provided in a number corresponding to a number of insert holes. The support frame is connected to the display unit protection member by fitting the protrusions into the respective insert holes. The lens is coupled to an inwardly-protruding portion of the support frame having a polygonal cross-section. The protrusions are provided along a perimeter of the support frame at positions corresponding to the respective insert holes and are elastically and removably fitted into the corresponding insert holes.

In another aspect, the present invention provides a wide display, including a display unit protection member, a plurality of protrusions, a blocking film and a lens. The display unit protection member is provided on a perimeter of a display unit. A plurality of insert holes are formed in the display unit protection member. A plurality of protrusions are provided in a number corresponding to a number of insert holes. The protrusions are fastened to the display unit protection member in such a way that the protrusions are fitted into the respective insert holes. The blocking film comprises a first surface containing an adhesive material adhering to the protrusions, and a second surface containing chrome and an adhesive material. The lens has an etched surface formed by etching a lower portion of a periphery thereof. The lens is provided with protrusions by attaching the second surface containing the adhesive material to the etched surface. The blocking film is interposed between the protrusions and the etched surface, and the protrusions are elastically and removably fitted into the respective insert holes disposed at positions corresponding to the protrusions.

In a further aspect, the present invention provides a wide display, including a display unit protection member, a blocking film and a lens. The display unit protection member is coupled to a display unit by passing coupling members through the display unit protection member and inserting the coupling members into insert holes, formed in a perimeter of the display unit. A protrusion frame protrudes from the display unit protection member by a predetermined height. The blocking film comprises a first surface containing an adhesive material adhering to the protrusion frame, and a second surface containing chrome and an adhesive material. The lens has an etched surface formed by etching a lower portion of a periphery thereof. The lens is coupled to the display unit protection member by attaching the second surface containing the adhesive material to the etched surface. The blocking film is interposed between the protrusion frame and the etched surface, and the predetermined height of the protrusion frame ranges from 2 mm to 10 mm.

In yet another aspect, the present invention provides a wide display, including a display unit protection member, a plurality of protrusions, a plurality of intermediate coupling members, a blocking film and a lens. The display unit protection member is provided on a perimeter of a display unit. A plurality of insert holes are formed in the display unit protection member. A plurality of protrusions are provided in a number corresponding to a number of insert holes. The protrusions are fastened to the display unit protection member in such a way that the protrusions are fitted into the respective insert holes. A plurality of intermediate coupling members are coupled to the respective protrusions. The blocking film comprises a first surface containing an adhesive material adhering to the intermediate coupling member, and a second surface containing chrome and an adhesive material. The lens has an etched surface formed by etching a lower portion of a periphery thereof. The lens is provided with the intermediate coupling members by attaching the second surface containing the adhesive material to the etched surface. The blocking film is interposed between the intermediate coupling members and the etched surface. The protrusions are elastically removably fitted into the respective insert holes disposed at positions corresponding to the protrusions. The intermediate coupling members are coupled in a pair to each of corners of the lens.

In still another aspect, the present invention provides a wide display, including a display unit protection member, a support frame, a blocking film and a lens. The display unit protection member is coupled to a display unit by passing coupling members through the display unit protection member and inserting the coupling members into insert holes formed in a perimeter of the display unit. The support frame is attached to an upper end of the display unit protection member. The blocking film comprises a first surface containing an adhesive material adhering to the support frame, and a second surface containing chrome and an adhesive material. The lens has an etched surface formed by etching a lower portion of a periphery thereof. The lens is coupled to the support frame by attaching the second surface containing the adhesive material to the etched surface. The blocking film is interposed between the support frame and the etched surface, and the coupling members are disposed at positions corresponding to the insert holes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
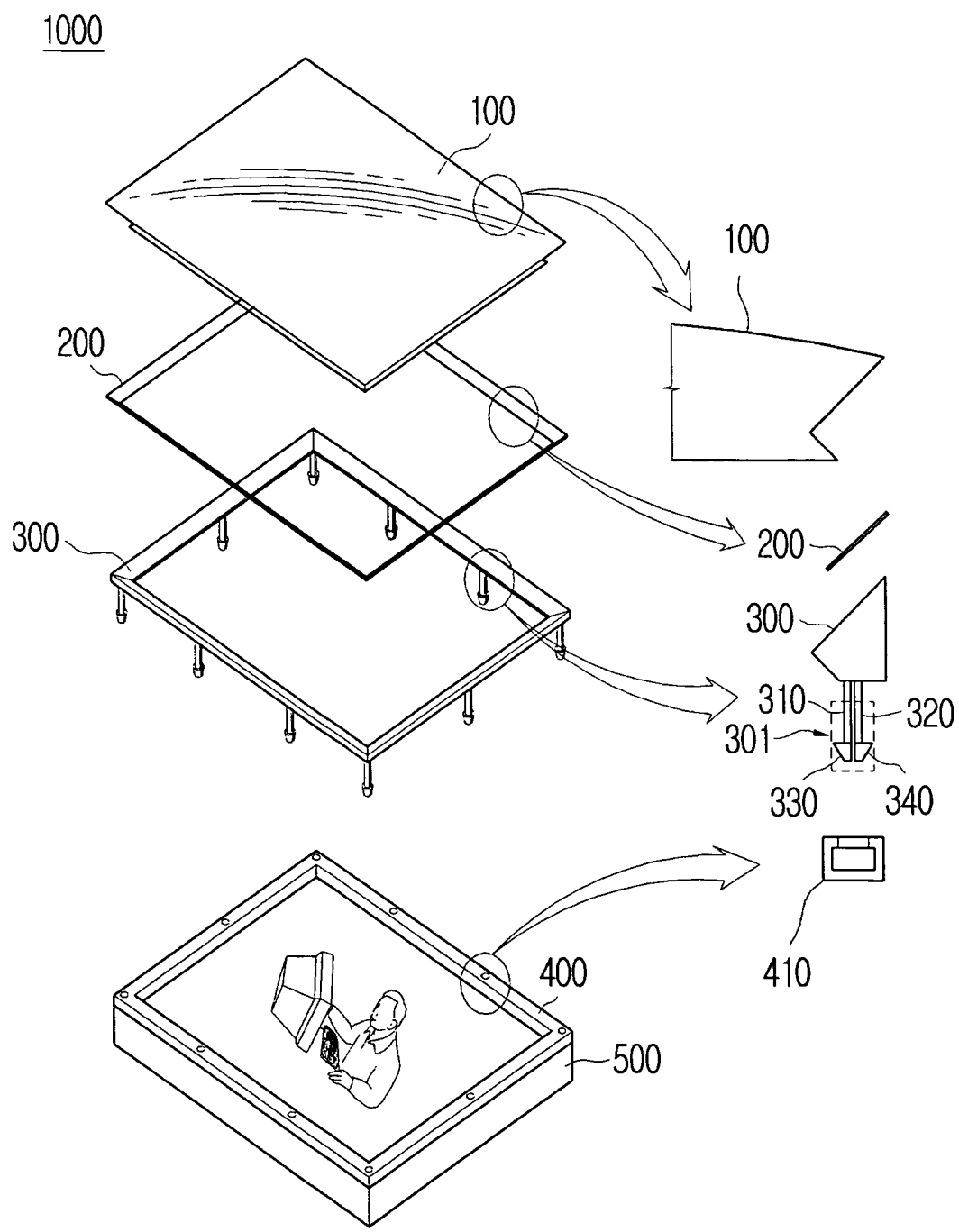
FIG. 1 is a view illustrating a wide display with a lens, according to a first embodiment of the present invention.

Hereinafter, a wide display with a lens according to the present invention will be described in detail with reference to the attached drawings. If in the specification, detailed descriptions of well-known functions or configurations might unnecessarily make the gist of the present invention obscure, the detailed descriptions will be omitted. The terms and words used in the description of the present invention are determined in consideration of the functions of the elements in the present invention. The terms and words may be changed depending on the intention or practice of users or operators. Therefore, the definitions of the terms and words should be defined based on the content of the specification taken in its entirety.

It should be noted that the same reference numerals are used throughout the different drawings to designate the same or similar components.

Figure 2:
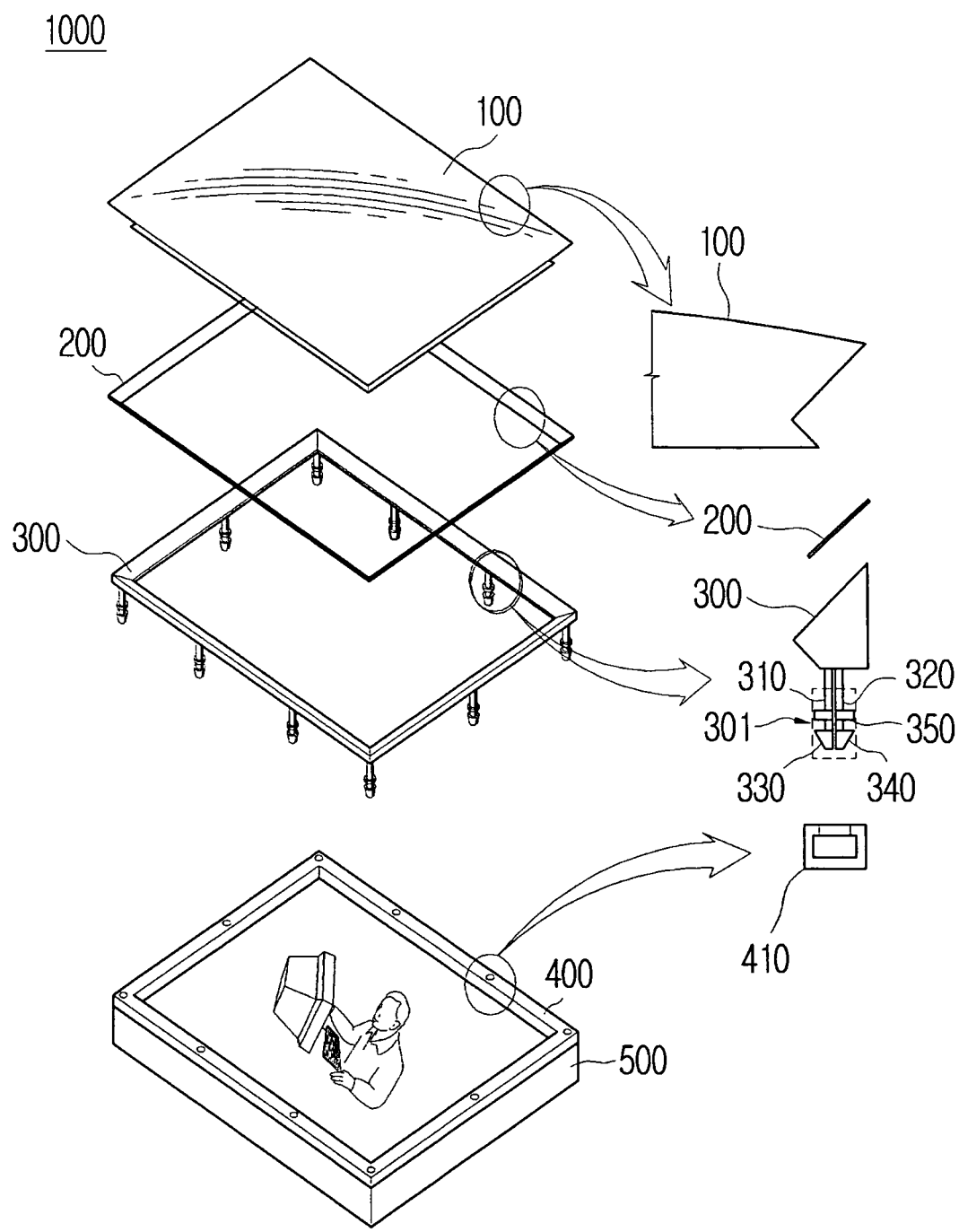
FIG. 2 is a view illustrating a modification of the wide display of FIG. 1.
Figure 3:
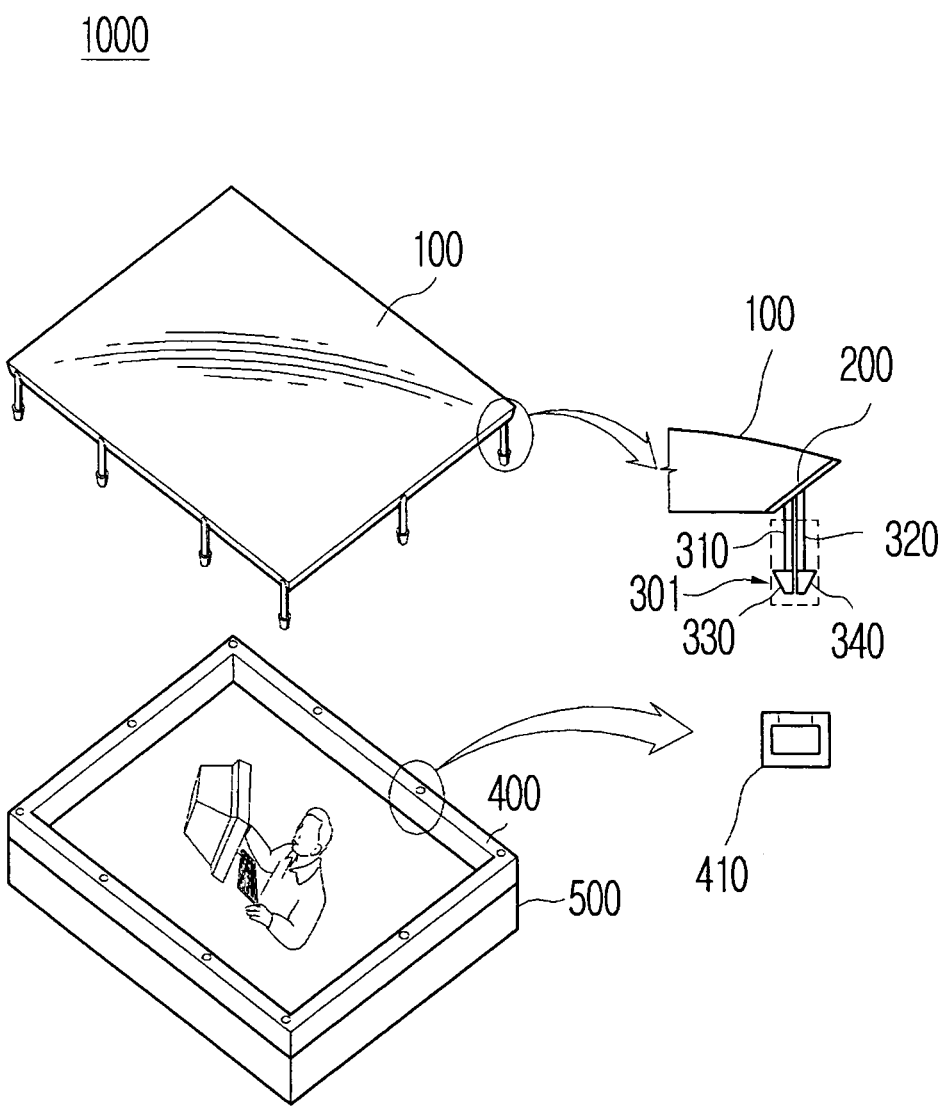
FIG. 3 is a view illustrating a wide display with a lens, according to a second embodiment of the present invention.
Figure 4:
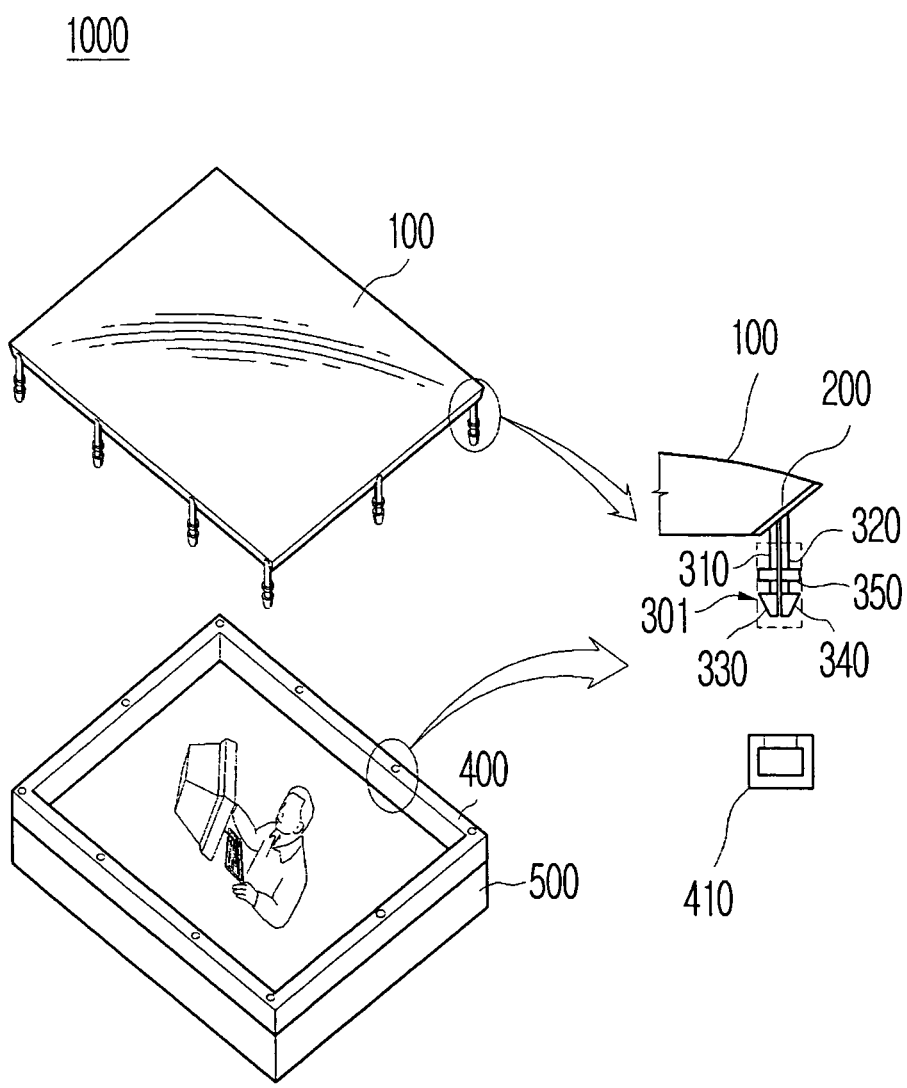
FIG. 4 is a view illustrating a modification of the wide display of FIG. 3.
Figure 5:
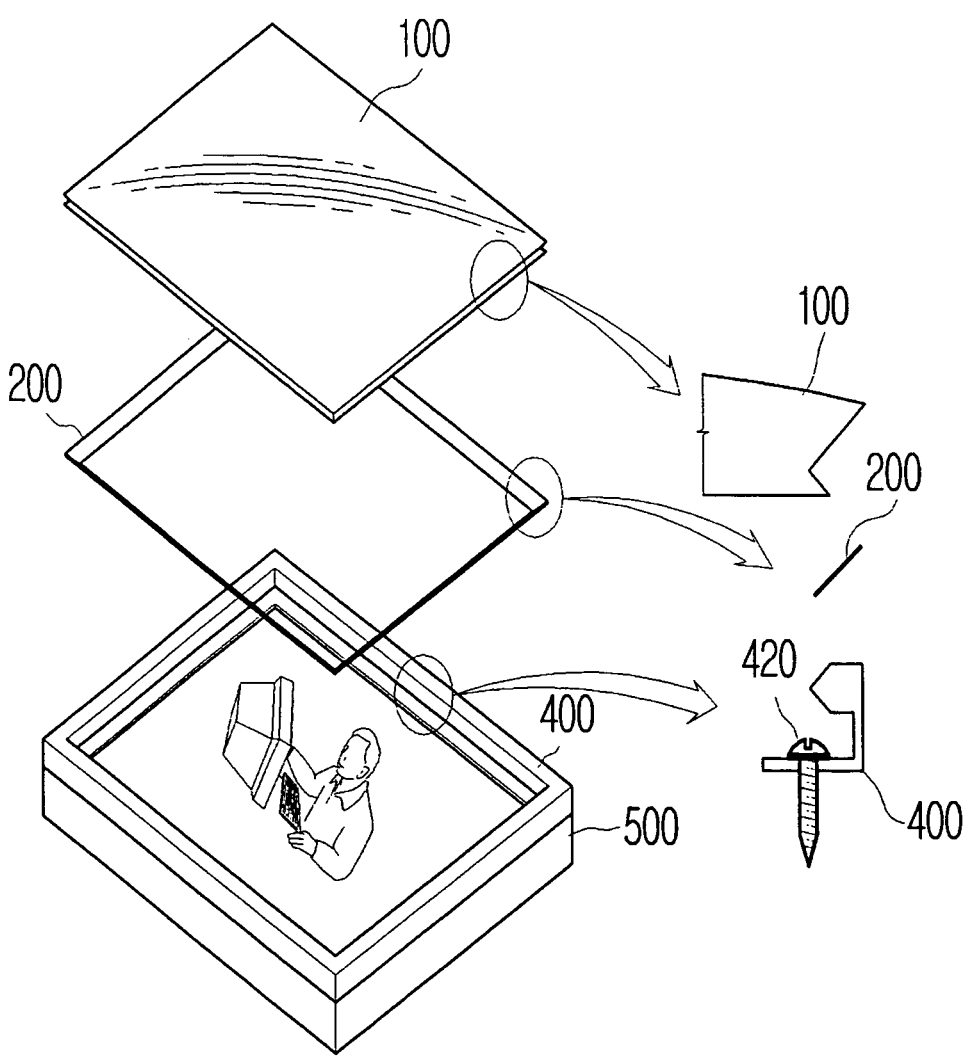
FIG. 5 is a view illustrating a wide display with a lens, according to a third embodiment of the present invention.
Figure 6:
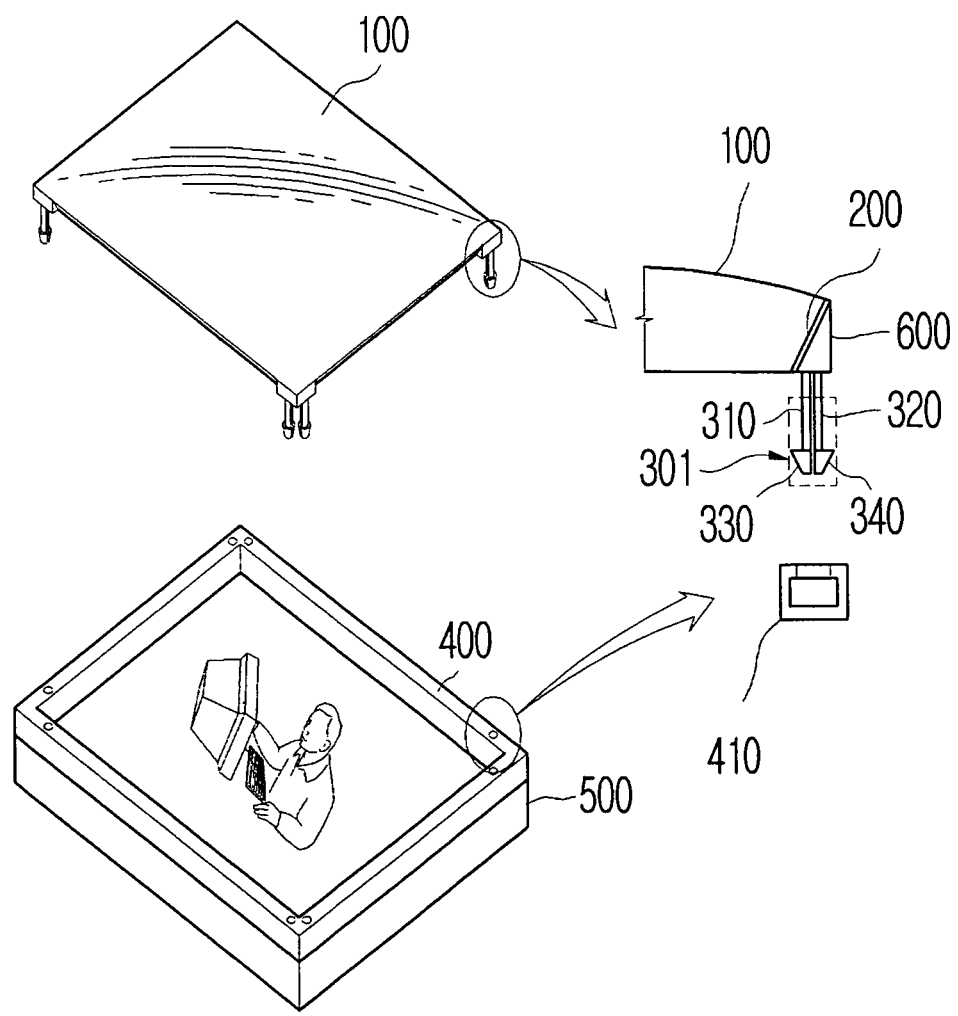
FIG. 6 is a view illustrating a wide display with a lens, according to a fourth embodiment of the present invention.
Figure 7:
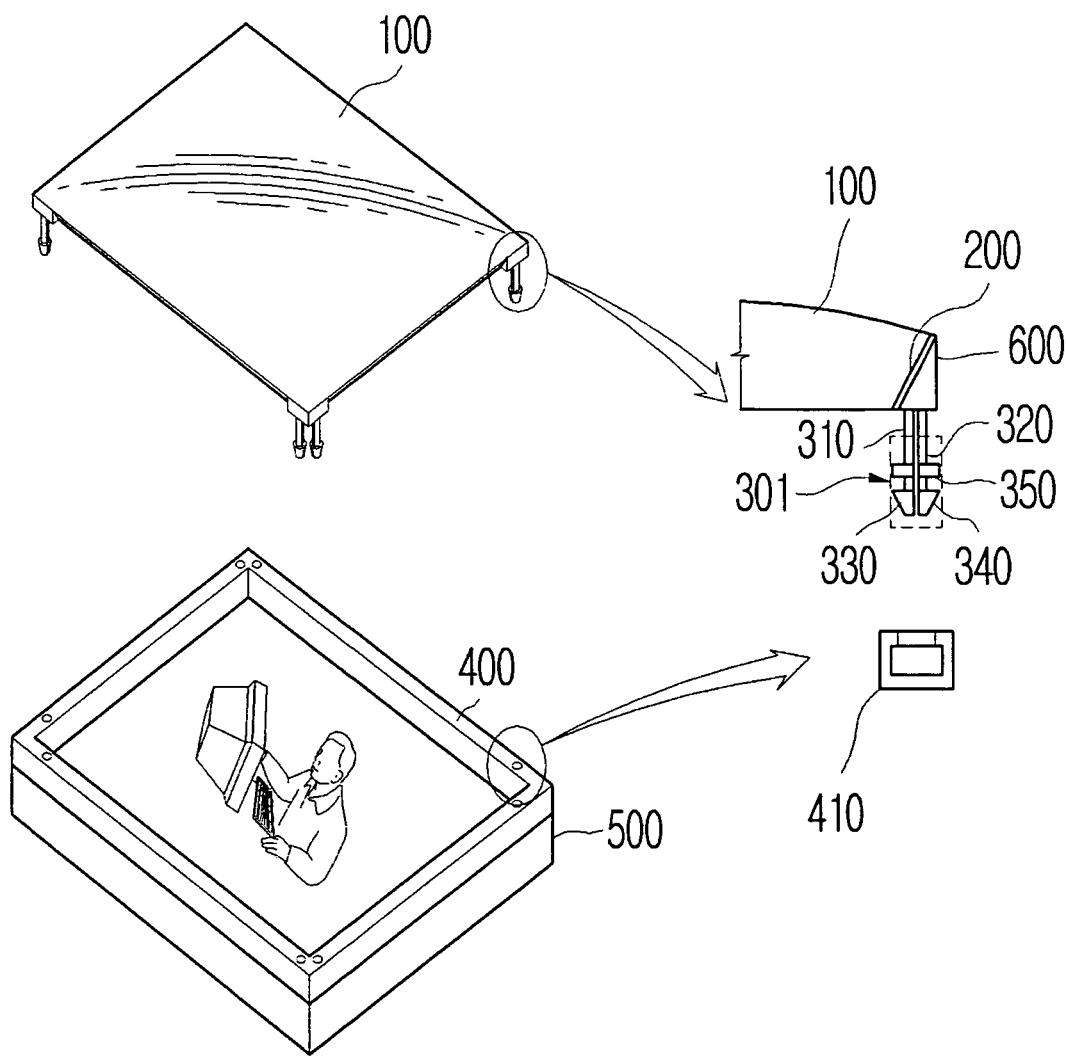
FIG. 7 is a view illustrating a modification of the wide display of FIG. 6.
Figure 8:
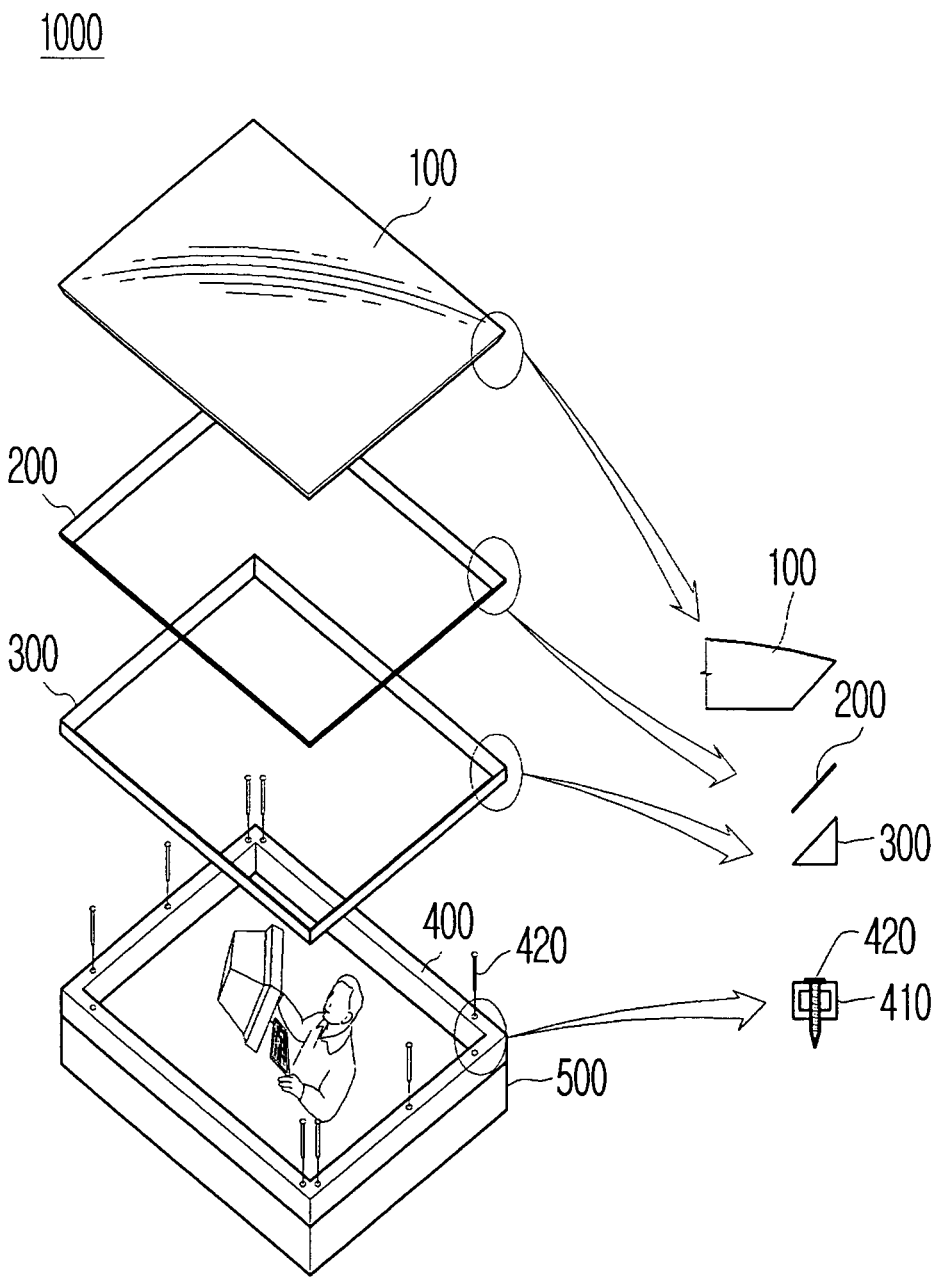
FIG. 8 is a view illustrating a wide display with a lens, according to a fifth embodiment of the present invention.

FIG. 1 is a view illustrating a wide display with a lens, according to a first embodiment of the present invention. FIG. 2 is a view illustrating a modification of the wide display of FIG. 1. FIG. 3 is a view illustrating a wide display with a lens, according to a second embodiment of the present invention. FIG. 4 is a view illustrating a modification of the wide display of FIG. 3. FIG. 5 is a view illustrating a wide display with a lens, according to a third embodiment of the present invention. FIG. 6 is a view illustrating a wide display with a lens, according to a fourth embodiment of the present invention. FIG. 7 is a view illustrating a modification of the wide display of FIG. 6. FIG. 8 is a view illustrating a wide display with a lens, according to a fifth embodiment of the present invention.

EMBODIMENTS

First Embodiment

Referring to FIG. 1, a wide display 1000 according to the first embodiment of the present invention includes a display unit protection member 400, a support frame 300, a blocking film 200 and a lens 100. In the wide display 1000, the lens 100 is installed on the front surface of a display unit 500 to provide the optical effect of making the display look wider. Thereby, the display unit protection member 400 provided on the perimeter of the display unit 500 can be optically hidden, and an image displayed on the display unit 500 can look wider.

In detail, the display unit protection member 400 is provided on the perimeter of the display unit 500 to protect the display unit 500 from external shocks. A plurality of insert holes 410 are formed in the display unit protection member 400.

The size of the display unit protection member 400 matches that of the display unit 500. In other words, if the display unit 500 is widened, the display unit protection member 400 is also widened. The display unit protection member 400 may be attached to the perimeter of the display unit 500 by an adhesive. Alternatively, the display unit protection member 400 may be fitted over the perimeter of the display unit 500.

The support frame 300 has on a corresponding surface thereof a plurality of protrusions 301 corresponding to the number of insert holes 410 that are formed in the display unit protection member 400. The protrusions 301 are elastically fitted into the respective insert holes 410 so as to couple the support frame 300 to the display unit protection member 400.

As such, the display unit protection member 400 reliably supports the support frame 300 in such a way that the protrusions 301 are fitted into the respective insert holes 410, so that even when external force is applied to the support frame 300, the support frame 300 can be prevented from being dislocated from the original position.

The protrusions 301 are provided along the perimeter of the support frame 300 at positions corresponding to the respective insert holes 410. The protrusions 301 are elastically removably coupled to the corresponding insert holes 410 of the display unit protection member 400.

Each protrusion 301 includes first and second connection rods 310 and 320 and first and second coupling inserts 330 and 340.

The first and second connection rods 310 and 320 and the first and second coupling inserts 330 and 340 are made of plastic, synthetic resin or synthetic fiber. In this embodiment, the first connection rod 310 has a length ranging from 4 mm to 40 mm.

The second connection rod 320 is symmetrical with the first connection rod 310 and is spaced apart from the first connection rod 310 by a distance ranging from 0.1 mm to 1 mm. Further, the second connection rod 320 has the same shape and length as does the first connection rod 310.

The first coupling insert 330 is integrally provided on the first connection rod 310 and has a triangular pyramid shape which ranges in height from 2 mm to 10 mm.

The second coupling insert 340 is integrally provided on the second connection rod 320 and has the same height and shape as those of the first coupling insert 330.

Each insert hole 410 into which the corresponding first and second coupling inserts 330 and 340 are fitted must have a depth equal to or greater than the height of the first and second coupling inserts 330 and 340. The reason for this is that if the depth of the insert hole 410 is less than the height of the first and second coupling inserts 330 and 340, it may be difficult to couple them to each other, and that even should the coupling be completed, the first and second coupling inserts 300 and 340 may be easily undesirably removed from the insert hole 410 when an external shock is applied thereto.

As shown in FIG. 2, fastening members 350 may be respectively provided on the first and second coupling inserts 330 and 340 of each protrusion 301. When the first and second coupling inserts 330 and 340 are coupled to the corresponding insert hole 410, the fastening members 350 are brought into close contact with and are fastened to the upper end of the insert hole 410, thus preventing the first and second coupling inserts 330 and 340 from undesirably shaking.

The blocking film 200 is interposed between the lens 100 and the support frame 300 having a polygonal cross-section. The blocking film 200 includes a first surface which comes into contact with a peripheral surface of the lens 100 and contains chrome therein, and a second surface which contains adhesive material with which the blocking film 200 adheres to the support frame 300 having the polygonal cross-section.

The first surface of the blocking film 200 that comes into contact with the peripheral surface of the lens 100 forms a blocking layer containing chrome. Further, the blocking film 200 optically shields the support frame 300 that is at an opposite side to the first surface using the optical effect of providing perspective, so that a user who watches images, for example, TV broadcasting, on the display unit 500 cannot discern that the support frame 300 is present, and the images displayed on the display unit 500 can look wider.

Furthermore, the protrusions 301 provided on the support frame 300 are designed such that when coupling the lens 100 to the display unit protection member 400, a predetermined height or distance is defined therebetween so that the support frame 300 cannot be seen, and images, for example, TV images, displayed on the display unit 500 can look wider in a synaesthetic manner. Thus, a variety of images, for example, TV images pertaining to a soap opera, a film, news, entertainment, sports, etc., that are displayed on the display unit 500 can be realistically expressed.

The lens 100 is coupled to the inwardly-protruding portion of the support frame 300 having the polygonal cross-section with the blocking film 200 interposed therebetween.

The lens 100 includes an outer surface portion which is exposed to the outside environment, and an inner surface portion which faces a display panel of the display unit 500. The circumferential length of the outer surface portion is longer than that of the inner surface portion.

Second Embodiment

As shown in FIG. 3, a wide display 1000 according to the second embodiment of the present invention includes a display unit protection member 400, a plurality of protrusions 301, a blocking film 200 and a lens 100.

The display unit protection member 400 is provided on the perimeter of the display unit 500 and has a plurality of insert holes 410.

The number of protrusions 301 corresponds to the number of insert holes 410. The protrusions 301 are respectively fitted into the insert holes 410 and are fastened to the display unit protection member 400.

Each protrusion 301 includes first and second connection rods 310 and 320 and first and second coupling inserts 330 and 340.

The first connection rod 310 has a length ranging from 4 mm to 40 mm. The second connection rod 320 is symmetrical with the first connection rod 310 and is spaced apart from the first connection rod 310 by a distance ranging from 0.1 mm to 1 mm. Further, the second connection rod 320 has the same shape as that of the first connection rod 310 and ranges between 3.5 mm and 39.5 mm in length.

The first coupling insert 330 is integrally provided on the first connection rod 310 and has a triangular pyramid shape that is from 2 mm to 10 mm in height.

The second coupling insert 340 is integrally provided on the second connection rod 320 and has the same height and shape as those of the first coupling insert 330.

The depth of each insert hole 410 into which the corresponding first and second coupling inserts 330 and 340 are fitted is equal to or greater than the height of the first and second coupling inserts 330 and 340.

As shown in FIG. 4, fastening members 350 may be respectively provided on the first and second coupling inserts 330 and 340 of each protrusion 301. When the first and second coupling inserts 330 and 340 are coupled to the corresponding insert hole 410, the fastening members 350 are brought into close contact with and are fastened to the upper end of the insert hole 410, thus preventing the first and second coupling inserts 330 and 340 from undesirably moving.

The blocking film 200 includes a first surface which contains an adhesive material that adheres with the protrusions 310, and a second surface which contains chrome therein.

The second surface of the blocking film 200 that comes into contact with the peripheral surface of the lens 100 forms a blocking layer containing chrome. Further, the blocking film 200 hides the display unit protection member 400 that is at an opposite side to the second surface using the optical effect of providing perspective, so that a user who watches images, for example, TV broadcasting, on the display unit 500 cannot discern that the display unit protection member 400 is present, and the images displayed on the display unit 500 can look wider.

Furthermore, the protrusions 301 are designed such that a screen seems to be spaced apart from the display unit 500 by the length of the protrusions 301 that connect the lens 100 to the display unit protection member 400, thus providing the optical effect of making the display unit 500 look wider because of the thickness of display unit protection member 400. In addition, a synaesthetic sense is given to the user who watches images, for example, TV broadcasting. Thereby, a variety of images, for example, TV images pertaining to a soap opera, a film, news, entertainment, sports, etc., that are displayed on the display unit 500 can be realistically expressed.

The blocking film 200 is interposed between the protrusions 301 and an etched surface of the lens 100. The protrusions 301 are elastically and removably fitted into the corresponding insert holes 401 that are formed at positions facing the protrusions 301.

The second surface of the blocking film 200 which contains chrome and adhesive material adheres to the etched surface which is formed by etching a lower portion of the periphery of the lens 100. Eventually, the lens 100 has the first surface of the blocking film 200 that contains adhesive material, and the protrusions 301 which are attached to the first surface.

The lens 100 includes an outer surface portion which is exposed to the outside environment, and an inner surface portion which faces a display panel of the display unit 500. The circumference length of the outer surface portion is longer than that of the inner surface portion.

Third Embodiment

As shown in FIG. 5, a wide display 1000 according to the third embodiment of the present invention includes a display unit protection member 400, a blocking film 200 and a lens 100.

The display unit protection member 400 is coupled to the display unit 500 by inserting coupling members 420 into insert holes 410 formed in the perimeter of the display unit 500.

The blocking film 200 includes a first surface which contains adhesive material which adheres to a protrusion frame (not shown) protruding from the display unit protection member 400 by a predetermined height, and a second surface which contains chrome therein.

The blocking film 200 is interposed between the display unit protection member 400 and an etched surface of the lens 100. There is a height difference ranging from 2 mm to 10 mm between the protrusion frame (not shown) and a plurality of holes (not shown) formed in the display unit protection member 400.

The reason why the blocking film 200 having the second surface containing chrome therein is provided is that the chrome forms a blocking layer that optically shields the display unit protection member 400 that is on a side opposite to the second surface. Therefore, when the blocking film 200 is interposed between the etched surface of the lens 100 which was previously manufactured in a customized form and the protrusion frame of the display unit protection member 400, the effect provided by the optical illusion of making the screen of the display look wider because of the thickness of the display unit protection member 400 is imparted to the user who watches images, for example, TV broadcasting, on the display unit 500, so that the user cannot discern that the support frame 300 is present.

The lens 100 is coupled to the display unit protection member 400 by adhering the second surface of the blocking film 200 which additionally contains adhesive material therein to the etched surface that is formed on a lower surface of the periphery of the lens 100 by etching.

The lens 100 includes an outer surface portion which is exposed to the outside environment, and an inner surface portion which faces a display panel of the display unit 500. The circumferential length of the outer surface portion is longer than that of the inner surface portion.

Fourth Embodiment

As shown in FIG. 6, a wide display 1000 according to the fourth embodiment of the present invention includes a display unit protection member 400, a plurality of protrusions 301, a plurality of intermediate coupling members 600, a blocking film 200 and a lens 100.

In detail, the display unit protection member 400 is provided on the perimeter of the display unit 500. A plurality of insert holes 410 are formed in the display unit protection member 400.

The protrusions 301 are provided in the number corresponding to the number of insert holes 410. The protrusions 301 are elastically fitted into the respective insert holes 410 and are thus fastened to the display unit protection member 400.

Each protrusion 301 includes first and second connection rods 310 and 320 and first and second coupling inserts 330 and 340.

The first connection rod 310 has a length ranging from 4 mm to 40 mm. The second connection rod 320 is symmetrical with the first connection rod 310 and is disposed at a position spaced apart from the first connection rod 310 by a distance ranging from 0.1 mm to 1 mm. Further, the second connection rod 320 has the same shape and length of those of the first connection rod 310.

The first coupling insert 330 is integrally provided on the first connection rod 310 and has a triangular pyramid shape which ranges in height from 2 mm to 10 mm. The second coupling insert 340 is integrally provided on the second connection rod 320 and has the same height and shape as those of the first coupling insert 330.

As shown in FIG. 7, fastening members 350 may be respectively provided on the first and second coupling inserts 330 and 340 of each protrusion 301. When the first and second coupling inserts 330 and 340 are coupled to the corresponding insert hole 410, the fastening members 350 are brought into close contact with and are fastened to the upper end of the insert hole 410, thus preventing the first and second coupling inserts 330 and 340 from undesirably shaking.

Each insert hole 410 into which the corresponding first and second coupling inserts 330 and 340 are fitted has a depth equal to or greater than the height of the first and second coupling inserts 330 and 340.

The intermediate coupling members 600 are coupled to the respective protrusions 301.

The blocking film 200 includes a first surface which contains adhesive material that is adhered to the intermediate coupling member 600, and a second surface which contains chrome therein.

The blocking film 200 is interposed between the intermediate coupling members 600 and an etched surface of the lens 100. The intermediate coupling members 600 are coupled in a pair to each corner of the lens 100.

The intermediate coupling members 600 are coupled to the lens 100 by attaching the second surface of the blocking film 200 that further contains adhesive material therein to the etched surface that is formed on a lower surface of the periphery of the lens 100 by etching.

The lens 100 includes an outer surface portion which is exposed to the outside environment, and an inner surface portion which faces a display panel of the display unit 500. The circumferential length of the outer surface portion is longer than that of the inner surface portion.

Fifth Embodiment

As shown in FIG. 8, a wide display 1000 according to the fifth embodiment of the present invention includes a display unit protection member 400, a support frame 300, a blocking film 200 and a lens 100.

The display unit protection member 400 is coupled to the display unit 500 by inserting coupling members 420 into insert holes 410 formed in the perimeter of the display unit 500.

The support frame 300 is attached to the upper surface of the display unit protection member 400.

The blocking film 200 includes a first surface which contains therein an adhesive material that is adhered to the support frame 300, and a second surface which contains chrome therein.

The blocking film 200 is interposed between the support frame 300 and an etched surface of the lens 100. The coupling members 420 are inserted into the corresponding insert holes 410.

The support frame 300 is coupled to the lens 100 by attaching the second surface of the blocking film 200 that further contains an adhesive material therein to the etched surface that is etched into a lower surface of the periphery of the lens 100.

The lens 100 includes an outer surface portion which is exposed to the outside environment, and an inner surface portion which faces a display panel of the display unit 500. The circumferential length of the outer surface portion is longer than that of the inner surface portion.

As described above, in a wide display with a lens according to the present invention, the lens is provided on the front of a display unit, and the distance between the lens and the front surface of the display unit is adjusted to an appropriate degree. Then, without changing the structure of the display unit, a display unit protection member which is provided on the perimeter of the display unit can be optically hidden only by an optical illusion effect induced by the lens. Further, an image displayed on the display unit can be extended by the lens.

In addition, the image displayed on the display unit can look smoother, and the image can be displayed in such a way that it looks wider.

Moreover, the present invention can improve the satisfaction of customers who want to increase the size of an image displayed on the display unit, thus increasing the buying rate and sales of the product. Furthermore, in light of the recent consumer trend to want to watch more realistic images, the present invention can reduce the burden of having to make an enormous investment in equipment to produce display units due to the recent trend of increasing size. Therefore, when use of the technique of the present invention is promoted in this art, both industrial development and national development can be promoted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wide display, comprising:
   a display unit protection member provided on a perimeter of a display unit, with a plurality of insert holes formed in the display unit protection member;
   a support frame having a plurality of protrusions provided in a number corresponding to a number of insert holes, the support frame being connected to the display unit protection member by fitting the protrusions into the respective insert holes; and
   an optical illusion lens coupled to an inwardly-protruding portion of the support frame having a polygonal cross-section,
   wherein the protrusions are provided along a perimeter of the support frame at positions corresponding to the respective insert holes and are elastically and removably fitted into the corresponding insert holes; and
   each of said protrusions comprises:
      a first connection rod having a length ranging from 4 mm to 40 mm;
      a second connection rod being symmetrical with the first connection rod and having a shape and length equal to a shape and length of the first connection rod, the second connection rod being spaced apart from the first connection rod by a distance ranging from 0.1 mm to 1 mm;
      a first coupling insert integrally provided on the first connection rod, the first coupling insert having a triangular pyramid shape and ranging in height from 2 mm to 10 mm;
      a second coupling insert integrally provided on the second connection rod, a height and shape of the second coupling insert being equal to a height and shape of the first coupling insert; and
   a depth of each of the insert holes into which the corresponding first and second coupling inserts are fitted is equal to or greater than the height of the first and second coupling inserts.

2. The wide display as set forth in claim 1, wherein the display unit protection member supports the support frame in such a way that the protrusions are fitted into the respective insert holes, so that when external force is applied to the support frame, the support frame is prevented from being removed from an original position thereof.

3. The wide display as set forth in claim 1, further comprising:
   fastening members respectively provided on the first and second coupling inserts, the fastening members being brought into close contact with and being fastened to an upper end of the corresponding insert hole when the first and second coupling inserts are fitted into the insert hole, thus preventing the first and second coupling inserts from moving.

4. The wide display as set forth in claim 1, wherein the lens comprises an outer surface portion exposed to an outside environment, and an inner surface portion facing a display panel of the display unit, wherein a circumferential length of the outer surface portion is longer than a circumferential length of the inner surface portion.

5. The wide display as set forth in claim 1, further comprising:
   a blocking film interposed between the lens and the support frame, the blocking film comprising a first surface coming into contact with a peripheral surface of the lens and containing chrome therein, and a second surface containing an adhesive material adhering to the support frame.

6. A wide display, comprising:
   a display unit protection member provided on a perimeter of a display unit, with a plurality of insert holes formed in the display unit protection member;
   a plurality of protrusions provided in a number corresponding to a number of insert holes, the protrusions being fastened to the display unit protection member in such a way that the protrusions are fitted into the respective insert holes;
   a blocking film comprising a first surface containing an adhesive material adhering to the protrusions, and a second surface containing chrome and an adhesive material; and an optical illusion lens having an etched surface formed by etching a lower portion of a periphery thereof, the lens being provided with protrusions by attaching the second surface containing the adhesive material to the etched surface, wherein the blocking film is interposed between the protrusions and the etched surface, and the protrusions are elastically and removably fitted into the respective insert holes disposed at positions corresponding to the protrusions; and each of the protrusions comprises:
  a first connection rod having a length ranging from 4 mm to 40 mm;
  a second connection rod being symmetrical with the first connection rod and having a length ranging from 3.5 mm to 39.5 mm in a shape equal to a shape of the first connection rod, the second connection rod being spaced apart from the first connection rod by a distance ranging from 0.1 mm to 1 mm;
  a first coupling insert integrally provided on the first connection rod, the first coupling insert having a triangular pyramid shape ranging in height from 2 mm to 10 mm; and
  a second coupling insert integrally provided on the second connection rod, the second coupling insert having a height and shape equal to a height and shape of the first coupling insert; and
  a depth of each of the insert holes into which the corresponding first and second coupling inserts are fitted is equal to or greater than the height of the first and second coupling inserts.

7. The wide display as set forth in claim 6, further comprising:
  fastening members respectively provided on the first and second coupling inserts, the fastening members being brought into close contact with and being fastened to an upper end of the corresponding insert hole when the first and second coupling inserts are fitted into the insert hole, thus preventing the first and second coupling insert from moving.

8. The wide display as set forth in claim 6, wherein the lens comprises an outer surface portion exposed to an outside environment, and an inner surface portion facing a display panel of the display unit, wherein a circumferential length of the outer surface portion is longer than a circumferential length of the inner surface portion.

9. A wide display, comprising:
  a display unit protection member coupled to a display unit by passing coupling members through the display unit protection member and inserting the coupling members into insert holes, formed in a perimeter of the display unit, with a protrusion frame protruding from the display unit protection member by a predetermined height;
  a blocking film comprising a first surface containing an adhesive material adhering to the protrusion frame, and a second surface containing chrome and an adhesive material; and
  an optical illusion lens having an etched surface formed by etching a lower portion of a periphery thereof, the lens being coupled to the display unit protection member by attaching the second surface containing the adhesive material to the etched surface,
  wherein the blocking film is interposed between the protrusion frame and the etched surface, and the predetermined height of the protrusion frame ranges from 2 mm to 10 mm.

10. The wide display as set forth in claim 9, wherein the lens comprises an outer surface portion exposed to an outside environment, and an inner surface portion facing a display panel of the display unit, wherein a circumferential length of the outer surface portion is longer than a circumferential length of the inner surface portion.

11. The wide display as set forth in claim 9, wherein the lens comprises an outer surface portion exposed to an outside environment, and an inner surface portion facing a display panel of the display unit, wherein a circumferential length of the outer surface portion is longer than a circumferential length of the inner surface portion.

12. A wide display, comprising:
  a display unit protection member provided on a perimeter of a display unit, with a plurality of insert holes formed in the display unit protection member;
  a plurality of protrusions provided in a number corresponding to a number of insert holes, the protrusions being fastened to the display unit protection member in such a way that the protrusions are fitted into the respective insert holes;
  a plurality of intermediate coupling members coupled to the respective protrusions;
  a blocking film comprising a first surface containing an adhesive material adhering to the intermediate coupling member, and a second surface containing chrome and an adhesive material; and
  a lens having an etched surface formed by etching a lower portion of a periphery thereof, the lens being provided with the intermediate coupling members by attaching the second surface containing the adhesive material to the etched surface,
  wherein the blocking film is interposed between the intermediate coupling members and the etched surface, the protrusions are elastically removably fitted into the respective insert holes disposed at positions corresponding to the protrusions, and the intermediate coupling members are coupled in a pair to each of corners of the lens.

13. The wide display as set forth in claim 12, wherein each of the protrusions comprises:
  a first connection rod having a length ranging from 4 mm to 40 mm;
  a second connection rod being symmetrical with the first connection rod and having a shape and length equal to a shape and length of the first connection rod, the second connection rod being spaced apart from the first connection rod by a distance ranging from 0.1 mm to 1 mm;
  a first coupling insert integrally provided on the first connection rod, the first coupling insert having a triangular pyramid shape and ranging in height from 2 mm to 10 mm; and
  a second coupling insert integrally provided on the second connection rod, the second coupling insert having a height and shape equal to a height and shape of the first coupling insert,
  wherein a depth of each of the insert holes into which the corresponding first and second coupling inserts are fitted is equal to or greater than the height of the first and second coupling inserts.

14. The wide display as set forth in claim 13, further comprising:
  fastening members respectively provided on the first and second coupling inserts, the fastening members being brought into close contact with and being fastened to an upper end of the corresponding insert hole when the first and second coupling inserts are fitted into the insert hole, thus preventing the first and second coupling inserts from moving.

* * * * *